Patented July 29, 1941

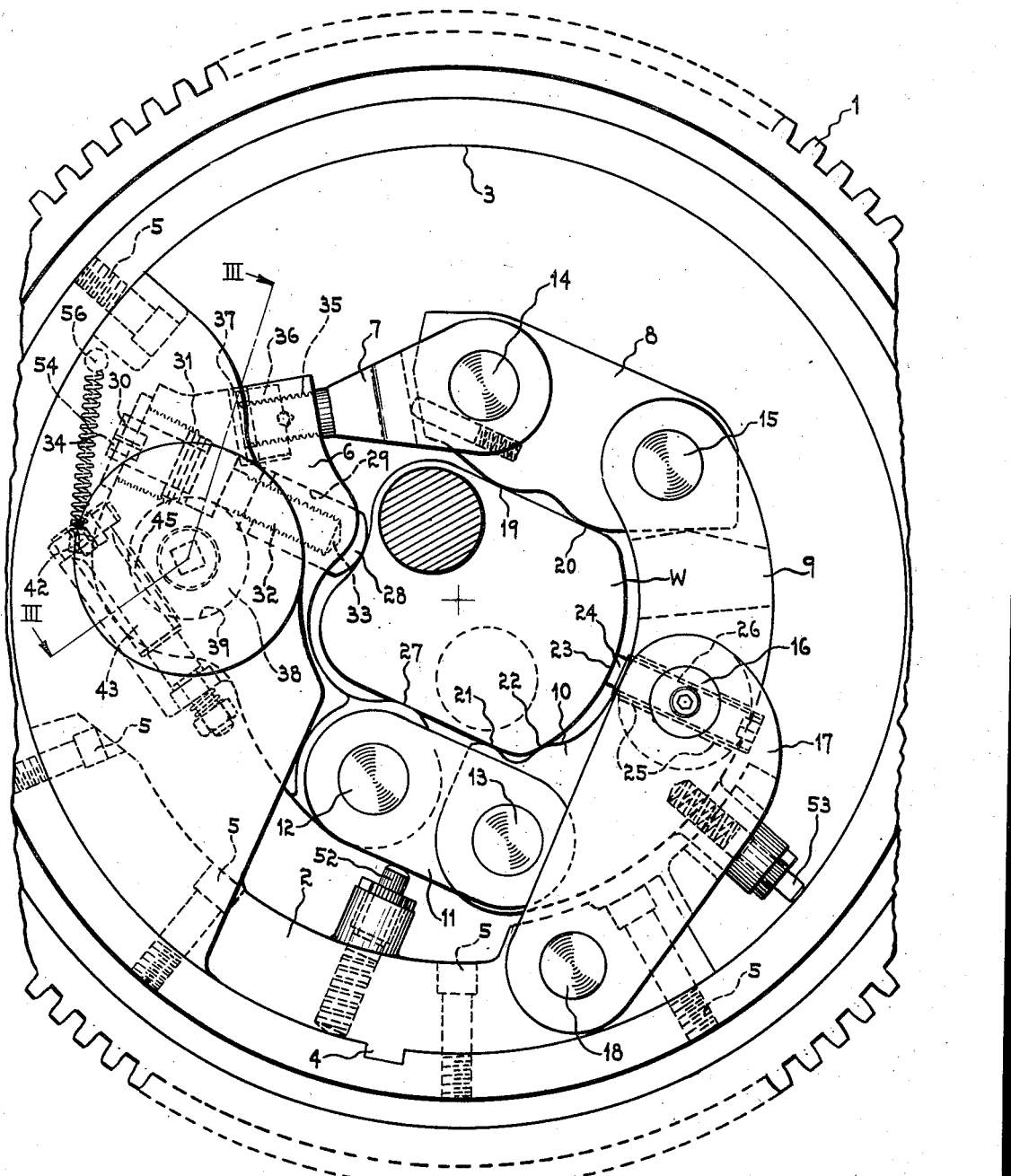
FIG. I

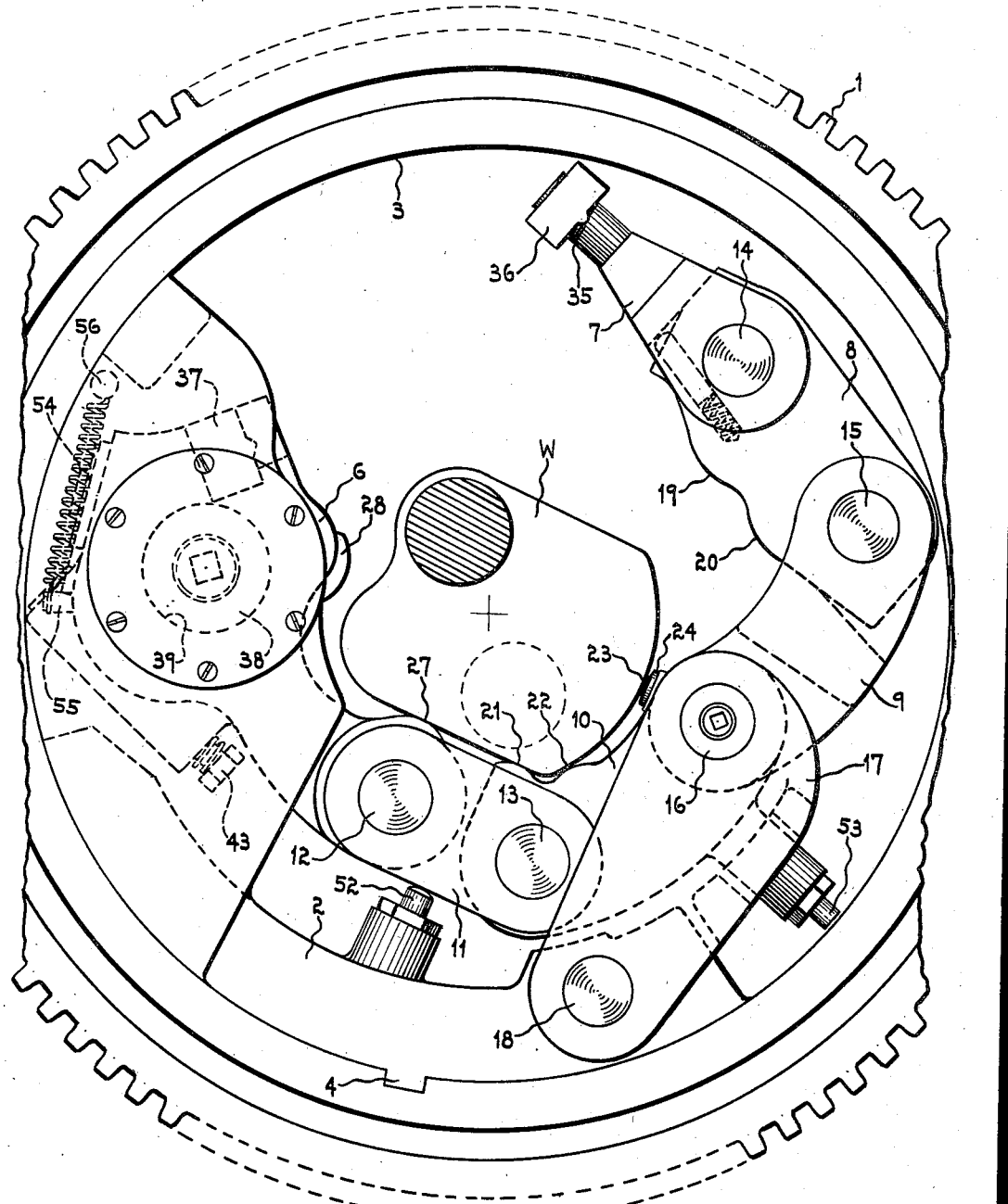

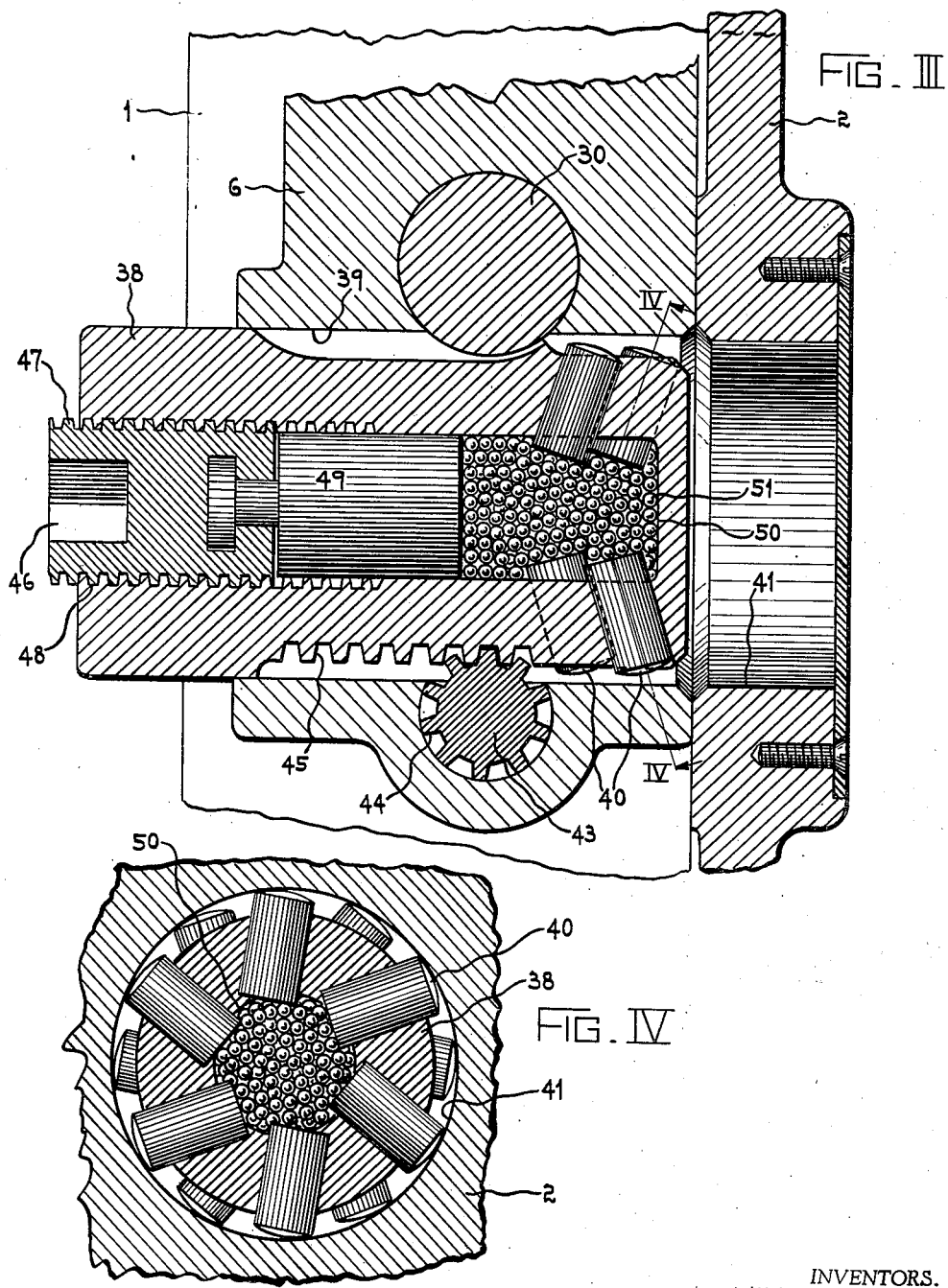

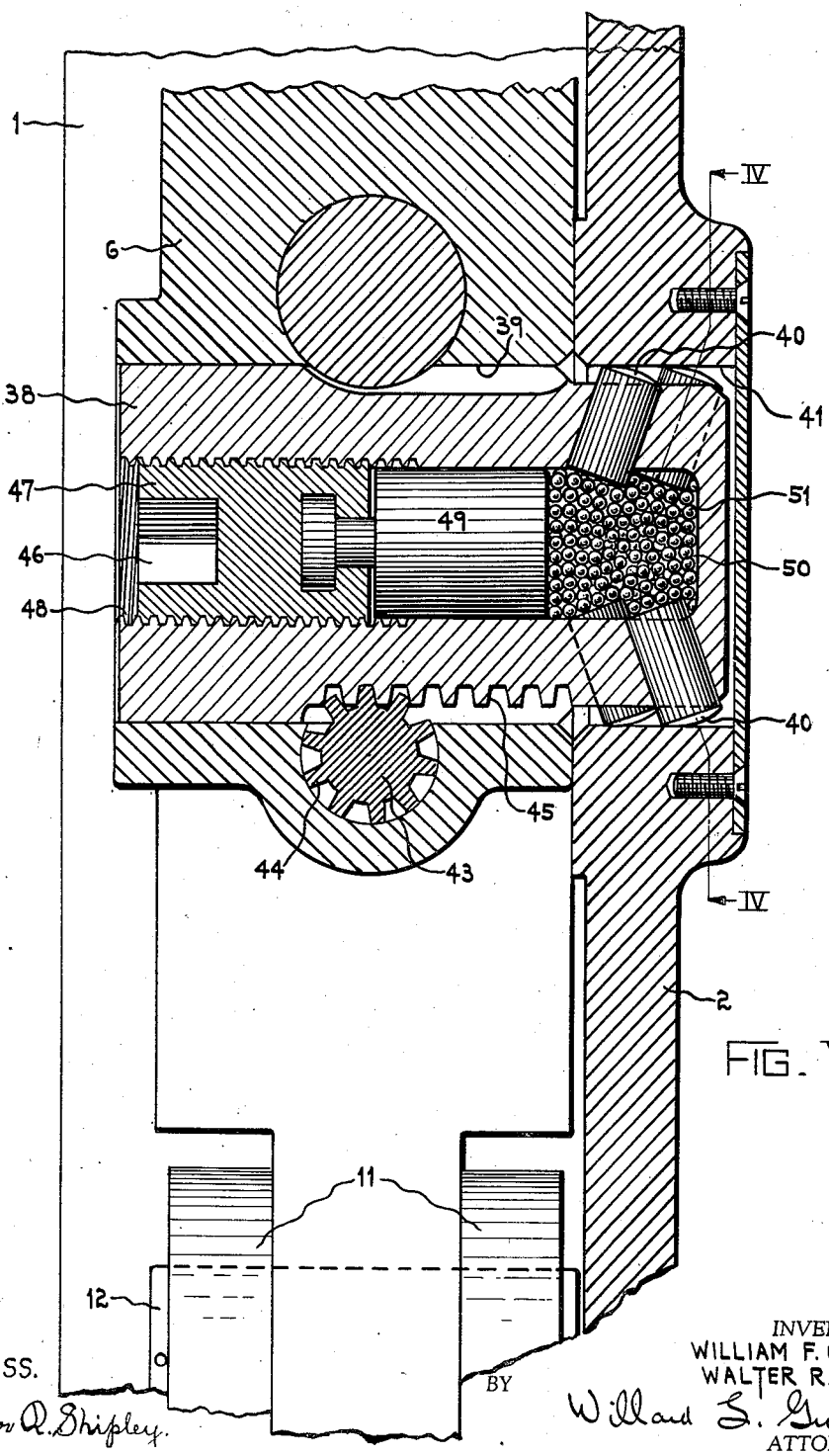
FIG. V

2,250,631

UNITED STATES PATENT OFFICE 2,250,631

CRANKSHAFT CHUCK

William F. Groene and Walter R. Meyer, Cincinnati, Ohio, assignors to The R. K. Le Blond Machine Tool Company, Cincinnati, Ohio, a corporation of Delaware Application October 16, 1939, Serial No. 299,732

10 Claims. (Cl. 82—40)

This invention pertains to chucking devices for machine tools and more particularly to chucking devices adapted to grip irregular pre-located work pieces in lathes and the like. More specially this invention pertains to the chucking and rotating of relatively long work pieces which are centered at each end and which must be supported and driven intermediate these ends as in a center drive lathe. This problem of driving rough irregular work pieces such, for example, as multi-throw crankshafts for internal combustion engines, is particularly difficult because such work pieces are relatively limber and easily deflectable from true centered position in the lathe due to the relatively large amount of material which must be rapidly removed from such work pieces during the machining operations thereon.

It is therefore the primary object of this invention to provide a chucking device which will grip such an irregular pre-located work piece with great rigidity by means of its rough surfaces, while at the same time not distorting it from its true pre-located position while holding it solidly for properly supporting and driving it during the machining operations.

One object of this invention is to provide a chuck having a work engaging mechanism adapted to engage a rough irregular surface of a pre-located work piece at a large number of circumferentially disposed points on the work piece and to lock this mechanism subsequently, after its complete engagement with the work piece, to the chuck body whereby the work piece is positively held in accurate pre-located position so that it may be powerfully driven during machining operations to be performed thereon.

Another object of this invention is to provide in a chucking device work engaging mechanism comprising substantially a chain of work engaging links adapted to be wrapped around a rough irregular pre-located work piece to be gripped and to be tightened about said work piece to engage it at a multiplicity of points. And then it is our object to subsequently lock this work engaging mechanism, after it has been fully engaged with the work piece, to the chuck body in such a manner as not to cause dislocation of the work piece from its pre-located position while at the same time providing means whereby this work engaging portion is rigidly locked to the body of the chuck.

Another object of this invention is to provide a unique locking mechanism which floats to locking position as predetermined by the work piece engaging the work engaging members of the chuck but which, when finally locked up forms a solid and rigid abutment preventing all further movement of the work engaging members of the chuck relative to the chuck body so that the work piece is positively and rigidly held in accurate pre-located position during the machining operation to be performed on the work piece.

Further features and advantages of this invention will appear in the following detailed description of the drawings in which:

Fig. I is a view axially of a chucking device incorporating the features of this invention showing the chuck fully engaged on a pre-located rough irregular work piece in the chuck.

Fig. II is a similar axial view of the chucking device of Fig. I but showing the chuck disengaged from the work piece illustrating the position of the various chucking members at the time of insertion or removal of the work piece therefrom.

Fig. III is an enlarged section of the locking device on the line III—III of Fig. I showing it withdrawn from locking position at the time of initial engagement of the work engaging mechanism with the work piece.

Fig. IV is a transverse section through the locking plungers substantially on the line IV—IV of Figs. III and V.

Fig. V is an enlarged section similar to that of Fig. III but showing the relative position of the locking plunger inserted into the abutment bore of the chuck body at the time of final locking of the work engaging mechanism with the chuck body for rigidly supporting and driving the work during the turning operation.

For purposes of an exemplary disclosure this invention is shown applied to a machine tool work spindle comprising a ring gear 1 of a center drive crankshaft lathe and comprises a segmental member 2 which is securely fixed to the bore 3 of this ring gear by means of the key 4 and suitable bolts 5. The work engaging member of this chucking device comprises a plurality of links 6, 7, 8, 9, 10 and 11, link 6 being connected to link 11 by a pin 12, link 11 being connected to link 10 by a pin 13, while link 7 is pivotedly mounted on link 8 by a pin 14 and the link 9 being connected to the link 8 by a pin 15, the links 9 and 10 being connected together by a common pin 16. This entire assembly of links is connected pivotedly to the chuck body through a link 17 which is pivotedly connected at one end about the common pin 16 above mentioned and pivotedly mounted in the segmental member 2 on a pin 18.

The link 8 has work engaging abutments 19 and 20 and the link 10 has work engaging abutments 21 and 22 and the adjustable abutment 23 comprising a set screw 24 threaded in the link 10 and passing through an appropriate clearance hole 26 in the pin 16. The link 6 has the work engaging abutment 27 and the movable clamping abutment or plunger 28 which may be moved axially in and out in the bore 29 of the link 6 by means of the actuating screw 30, which is axially confined in the link 6 by appropriate bearing means 31 and has a threaded end 32 operating in the threaded bore 33 of the plunger 28. An appropriate socket 34 for a suitable wrench is provided in screw 30 for rotating it one way or the other. The link 7 has a threaded outer end 35, having a normally fixed adjustable square nut 36 which may be entered in to the latch pocket 37 of the link 6 so as to latch link 7 thereto.

It will be apparent that when the screw 30 is tightened by appropriately applying a wrench to the socket 34 and rotating it to force the plunger 28 outwardly against the work piece W, the entire assembly of links will be caused to tighten and wrap themselves securely around the work piece, bringing all of the various abutments 19, 20, 21, 22, 23, 27 and 28 to firmly engage themselves with substantially equal pressure on the work surface. The abutment 23 is made adjustable for purposes of assisting in the initial orientation of the chain of links relative to the work W for best engagement of the various abutments therewith. The link 17 serves to substantially position this work engaging mechanism comprising the assembly of this chain of links for proper engagement with the work piece W which has been pre-located in the chuck body while at the same time permitting complete freedom of floating movement of the work engaging assembly so that it may firmly engage itself on the work piece without distorting it from its pre-located position. The link 17 however, does function to prevent rotation of this assembly relative to the chuck body when engaged on the work in cooperation with the locking piece for binding this assembly to the chuck body 1, as will now be described.

After this work engaging assembly has been clamped on the work as described, the locking plunger 38, best shown in Fig. III, is then moved axially in the bore 39 in the link 6, so as to move it to the right as shown in Fig. V to bring the abutment plungers 40 into the abutment bore 41 formed in the web portion of the segmental piece 2 fixed in the ring gear 1. This is accomplished by applying the chuck wrench previously applied to the socket 34 of the screw 30 to the socket 42 of the pinion shaft 43 appropriately journaled in the link 6 and having a pinion 44 arranged to engage the rack 45 cut on the periphery of the locking plunger 38 so that, by rotating this shaft 43 the plunger 38 may be moved axially in the bore 39 for moving the locking plunger into or out of the abutment bore 41. It is obvious that after the clamping of the work engaging assembly, comprising the series of links, has been tightly gripped on the work, the bores 39 and 41 do not necessarily accurately line up because of the rough irregularities of the work piece affects the precise engagement of various links with their abutment surfaces in any definite position for each crankshaft or work piece inserted in the chuck.

It is therefore necessary to have an equalizing locking mechanism to provide a positive locking pin between these two bores so as to prevent relative movement of the link and the chuck body after the initial engagement of the clamping mechanism on the work. Thus, after this plunger 38 has been axially moved to the right, Fig. V, to bring the locking plunger 40 into the bore 41, the wrench applied to the socket 46 of the locking screw 47 which is threaded in the plunger 38 in the threaded bore 48 so that when it is rotated the sliding plunger 49 is moved into the chamber 50 which is filled with metalic shot 51 or the like. The various abutment plungers 40 are arranged to slide radially in the locking plunger 38 and have their inner ends projecting into the chamber 50 to be engaged by the shot 51. Thus as the locking screw 47 is tightened to force the plunger 49 to the right, Fig. V, to compress the shot 51 the abutment plungers 40 will be moved radially outward until each one of them firmly engages the abutment bore 41 in the member 2 and after each of these plungers have firmly engaged itself with this bore, the final tightening of the screw 47 causes this shot to back up behind these plungers to form a solid abutment preventing their further movement so that there can be no relative movement between the link 6 and the entire work engaging link assembly and the member 2 of the chuck body. With this particular arrangement a locking device which is self-equalizing and which does not tend to cause distortion in the work piece as originally clamped up the work engaging mechanism is provided. Also this arrangement provides a fixed positive lock for the work engaging assembly after the final equalizing and clamping of the chucking device on the work is accomplished. It can thus be seen that since the locking device just described prevents all relative movement between the link 6 and the chuck body 2 in any radial direction relative to the axis of the locking plunger 38 and since the link 17 prevents any rotation of the work engaging link assembly about the axis of the plunger 38 and abutment bore 41, this link assembly of this chuck device will therefore positively hold the rough irregular pre-located work piece W in the chuck rigidly during the turning operations.

Noting particularly Fig. II, when the link assembly is endisengaged from the work by first removing the plunger from the position shown in Fig. V to that shown in Fig. III and then unlocking the screw 30 to remove the plunger 28 from engagement with the work and swinging link 7 out of the latch pocket 37 of link 6, the chuck will assume a position shown in Fig. II. When in this position the chuck is prepared for loading and unloading of the work piece W.

In order to facilitate properly positioning the work engaging assembly of the links without any manual assistance, a spring urged plunger 52 carried in the segmental piece 2 normally is urged radially inward of the chuck to engage the link 11 to cause additional relatively light contact of the abutment 21 of the link 10 and abutment 27 of the link 6 with the work piece W when in pre-located position in the chucking device. A spring urged plunger 53 carried in the link 10 and engaging the bore 3 of the ring gear 1 serves to engage the abutments 22 and 23 of the link 10 with the work piece when it is pre-located in the chucking device. Also a tension spring 54 connected to a pin 55 fixed in the link 6 and connected to a pin 56 fixed in the ring gear 1 serves to balance the weight of this link to facilitate swinging it to bring the abutments 27 and 28 into initial engagement with the work W. The purpose of this arrangement is to prevent the chucking assembly from dropping down too far away from the work for proper and easy engagement of the mechanism with the work W and to release excessive weight from the work piece when the assembly is clamped about it before the locking device is brought into effect which weight might otherwise cause a deflection of the shaft downwardly from its true pre-located position if this precaution were not taken.

We thus have a chucking device which is adaptable to engaging a pre-located work piece at a plurality of points on its rough irregular work surface in such a way as to provide a clamping device which will not slip on such work surfaces because of its multiplicity of points which may be brought into active play simultaneously on the work piece, and then to provide a means whereby this work engaging assembly is positively and securely locked to the chucking device or work spindle upon which it is mounted so that the work may be positively and rigidly held against all distortion or movement during such operations which may be performed on it.

Having thus fully set forth and described our invention in what we claim as new and designed to secure by United States Letters Patent is:

1. In a chuck, a rotary chuck body, a link pivotally mounted on said body, a pair of links pivotally mounted on the outer end of said first mentioned link, two integral and one adjustable work engaging abutments on one of said last mentioned links, a link pivotally mounted to the outer end of the link with the work engaging abutments, a link pivotally mounted to the outer end of the other of said pair of links, a pair of integral work engaging abutments on this last mentioned link, a latch link pivotally mounted on the outer end of this last mentioned link arranged to be latched with a clamping link pivotally mounted on the link connected to the link having the two integral and one adjustable abutments, and means movable in said clamping link to engage a work piece in the chuck to cause engagement of all of said abutments with said work piece.

2. In a chuck, a rotary chuck body, a link pivotally mounted on said body, a pair of links pivotally mounted on the outer end of said first mentioned link, two integral and one adjustable work engaging abutments on one of said last mentioned links, a link pivotally mounted to the outer end of the link with the work engaging abutments, a link pivotally mounted to the outer end of the other of said pair of links, a pair of integral work engaging abutments on this last mentioned link, a latch link pivotally mounted on the outer end of this last mentioned link arranged to be latched with a clamping link pivotally mounted on the link connected to the link having the two integral and one adjustable abutments, means movable in said clamping link to engage a work piece in the chuck to cause engagement of all of said abutments with said work piece, and means for locking said clamping link to said chuck body when said abutments are so engaged with the work.

3. In a chuck, a chuck body, means floatingly mounted in the chuck body to engage a work piece in the chuck, and means for locking said means to the chuck body when engaged with the work comprising a locking plunger movable in said work engaging means for movement into an abutment bore in said chuck body, radially movable abutment plungers in said locking plunger arranged to engage said abutment bore and having their inner ends projecting into a chamber in said locking plunger, shot in said chamber, and means in said locking plunger to exert pressure on said shot to force said abutment plungers into engagement with said abutment bore and to rigidly hold said plungers in engaged position with said abutment bore without causing relative movement between said work engaging means and said chuck body.

4. In a chuck, a chuck body, means floatingly mounted in the chuck body to engage a work piece in the chuck, and means for locking said means to the chuck body when engaged with the work comprising a member carried by said work engaging means in an abutment bore in said chuck body, radially movable abutment plungers in said member arranged to engage said abutment bore and having their inner ends projecting into a chamber in said member, shot in said chamber, and means in said member to exert pressure on said shot to force said abutment plungers into engagement with said abutment bore and to rigidly hold said plungers in engaged position with said abutment bore without causing relative movement between said work engaging means and said chuck body.

5. In a chuck, a chuck body, means floatingly mounted in the chuck body to engage a work piece in the chuck, and means for locking said means to the chuck body when engaged with the work comprising a member carried by said work engaging means in an abutment bore in said chuck body, radially movable abutment plungers in said member arranged to engage said abutment bore and having their inner ends projecting into a chamber in said member, shot in said chamber, means in said member to exert pressure on said shot to force said abutment plungers into engagement with said abutment bore and to rigidly hold said plungers in engaged position with said abutment bore without causing relative movement between said work engaging means and said chuck body, and means to prevent rotation of said work engaging means about said abutment bore.

6. In a chuck, a chuck body, means floatingly mounted in the chuck body to engage a work piece in the chuck, and means for locking said means to the chuck body when engaged with the work comprising a member carried by said work engaging means in an abutment bore in said chuck body, radially movable abutment plungers in said member arranged to engage said abutment bore and having their inner ends projecting into a chamber in said member, shot in said chamber, means in said member to exert pressure on said shot to force said abutment plungers into engagement with said abutment bore and to rigidly hold said plungers in engaged position with said abutment bore without causing relative movement between said work engaging means and said chuck body, and means in connection with said floating mounting to prevent rotation of said work engaging means about said abutment bore.

7. In a work holder for a rotatable machine tool spindle, a work engaging member floatingly mounted on said spindle for engagement with a work piece prelocated on the axis of rotation of said spindle comprising, a series of links to form a chain, means for tightening said member around the periphery of said work piece, and means for rigidly fastening said member to said spindle when engaged about said work piece to rigidly support said work piece on said axis of rotation of said spindle.

8. In a work holder for a rotatable machine tool spindle, a work engaging member floatingly mounted on said spindle for engagement with a work piece pre-located on the axis of rotation of said spindle comprising, a series of links to form a chain, means for wrapping said member about a work piece in said chuck, means for tightening said member around the periphery of said work piece, and means for rigidly fastening said member to said spindle when engaged about said work piece to rigidly support said work piece on said axis of rotation of said spindle.

9. In a work holder for a rotatable machine tool spindle, a work engaging member floatingly mounted on said spindle for engagement with a work piece pre-located on the axis of rotation of said spindle comprising, a plurality of interconnected links floatingly mounted on said spindle, a plurality of work engaging abutments on said links, means for tightening said links to engage said abutments around a pre-located work piece on the axis of rotation of said spindle, and means for locking said links rigidly on said work spindle when said links are tightened around said work piece for rigidly supporting said work piece on said axis of rotation of said spindle.

10. In a work holder for a rotatable machine tool spindle, a work engaging member floatingly mounted on said spindle for engagement with a work piece pre-located on the axis of rotation of said spindle comprising, a link pivotally mounted on said work spindle, a pair of links pivotally mounted on the outer end of said first mentioned link, a link pivotally mounted on the outer ends of each of said second mentioned links, and still other links pivotally mounted on the outer ends of said third mentioned links, means for latching said last mentioned links together when said links are wrapped around a work piece pre-located on the axis of rotation of said spindle, means for tightening said links against said work piece, and means for rigidly fastening said links to said work spindle when tightened on said work piece.

WILLIAM F. GROENE.
WALTER R. MEYER.